Feb. 13, 1940. H. G. HOEFLER 2,190,119
BIRD CAGE
Filed June 10, 1938 2 Sheets-Sheet 1
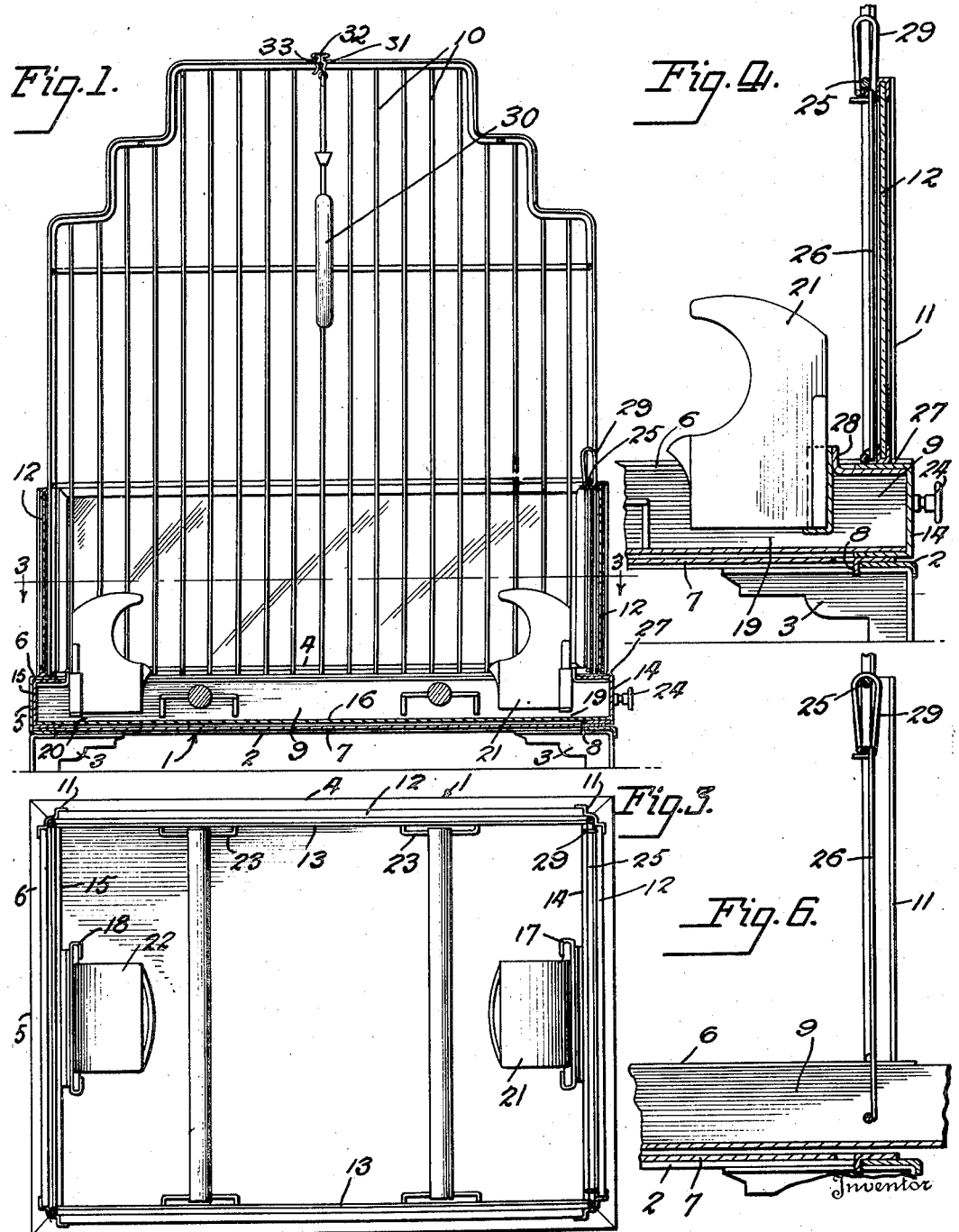
Herbert G. Hoefler Feb. 13, 1940.  H. G. HOEFLER  2,190,119
BIRD CAGE
Filed June 10, 1938  2 Sheets-Sheet 2
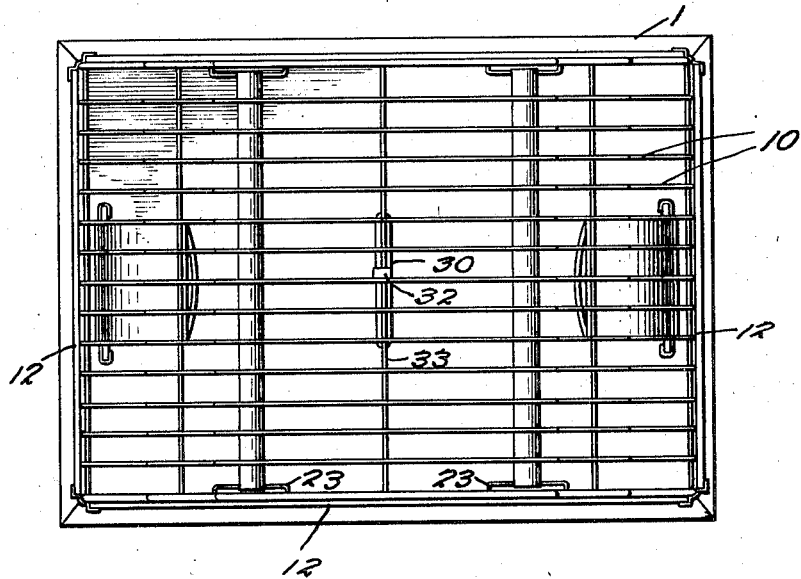
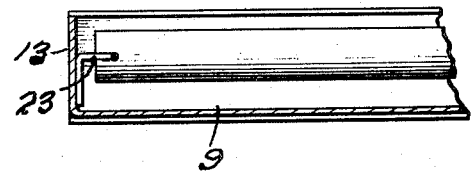
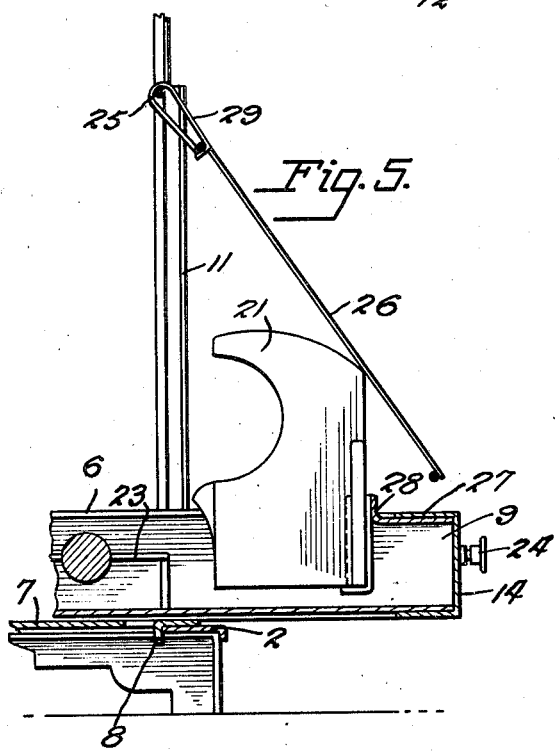
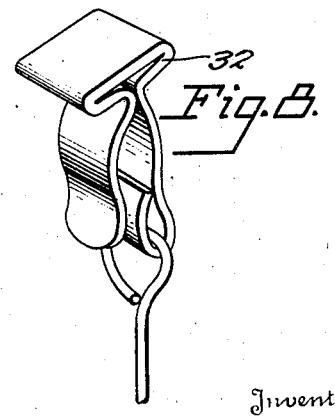
Inventor
Herbert G. Hoefler
By Mason Fenwick & Lawrence
Attorneys Patented Feb. 13, 1940

2,190,119

UNITED STATES PATENT OFFICE 2,190,119

BIRD CAGE

Herbert G. Hoefler, New Haven, Conn., assignor to The Andrew B. Hendryx Company, New Haven, Conn., a corporation of Connecticut Application June 10, 1938, Serial No. 213,061

11 Claims. (Cl. 119—17)

This invention relates to bird cages. It has for its general object an improved construction which enhances the living conditions of the bird, increases the facility with which the cage may be serviced, providing against the escape of the bird in the course of servicing, and improves the inherent possibilities for cleanliness and sanitation.

One of the objects of the invention is to provide a bird cage having the removable tray unit including food and drink bin holders and perch brackets fixed thereto, spaced from the floor of the tray and at such height as to maintain the members which they support spaced from said floor so that the entire bottom of the tray is at all times exposed to the air and no concealed areas of foul moisture can exist as is possible in other types of cages where the objects constituting cage furniture may rest upon the bottom of the tray.

Another object of the invention is the provision of a tray unit as described, the perch supports consisting of substantially horizontal guides along which the perches may be slidably adjusted in front of the food and drink bins, said guides being devoid of end obstructions, so that the perches may be slidably and entirely removed from the supports for the purpose of cleansing them.

A further object of the invention is to provide a bird cage with a tray slidably removable from beneath a hanging door which swings outwardly to permit the exit of said tray and its appurtenances, and having lost motion in its hinges causing it to drop gravitationally to a position in which its lower portion obstructs the space vacated by the tray, preventing escape of the bird.

Another object of the invention is to provide a bird cage having the sliding tray and hanging door as described in which a portion of the tray projects above the bottom edge of the door so that the tray cannot slide outwardly without swinging the door, and a panel which may be of glass or screen material, the main function of which is that of a guard to prevent scattering of the bird seed slidable in lateral guides over the front of the door, thereby inhibiting swinging of the door, and locking the tray in its fully inserted position.

Still another object of the invention is to provide a swinging perch which may be bodily removed from the cage from between the wires and without the necessity of opening any door of the cage.

Other objects of the invention will appear as the following description of a preferred and practical embodiment thereof proceeds.

In the drawings throughout the several figures of which the same characters of reference have been employed to designate identical parts:

Figure 1 is a side elevation partly in section, of a bird cage embodying the principles of the present invention;

Figure 2 is a top plan view;

Figure 3 is a horizontal section taken along the line 3—3 of Figure 1;

Figure 4 is a detail in section on an enlarged scale of a portion of Figure 1;

Figure 5 is a view similar to Figure 4 with the tray partly withdrawn;

Figure 6 is a section somewhat similar to that of Figure 4 illustrating the hanging door in its lowered position;

Figure 7 is a fragmentary section illustrating one of the perch supports; and

Figure 8 is a perspective view of the clip from which the swinging perch is suspended.

Referring now in detail to the several figures, the bottom of the cage comprises a rectangular frame 1 including the lower flange members 2 lying in a horizontal plane with the depending feet 3 and the upstanding side and rear end members 4 and 5 which terminate in the horizontal upper flanges 6. A removable bottom plate 7 rests upon the lower flange members 2. This plate is suitably held in place by means such as the downwardly struck lugs 8 which catch against the inner edge of the front lower flange member 2.

The side members 4 together with the upper side flanges 6 constitute guideways for a tray 9 which tray is slidably inserted through the open front end of the frame, resting upon the plate 7 when in its inserted position. The plate 7 serves to prevent the escape of the bird when the tray 9 is withdrawn and may be readily removed at any time for cleaning. When this is done the cage must be set upon a table or similar surface to prevent the bird escaping when the plate 6 is removed. The height of the feet 3 is preferably such that the open space beneath the bottom of the cage is too narrow to allow the bird to get out.

The sides, top and ends of the cage above the frame 1 are formed of spaced wires 10 as is customary in the art and suitably secured to the frame, and the lower portions of the vertical corners of the cage are provided with the channeled members 11 forming guideways in which the seed guards 12 slide. Said seed guards preferably extend only part way up the cage as shown in Figure 1 and are removable.

The tray 9 has the upstanding side and end flanges 13, 14 and 15 forming with the floor 16 a rectangular pan, the sides 13 being of such height as to snugly fit between the upper flanges 6 and lower flange members 2 of the frame 1 and the front end 14 closing the open front of the frame. A knob 24 secured to the front end 14 facilitates the drawing out of the tray.

The front and back ends 14 and 15 respectively have affixed thereto the food and drink bin holders 17 and 18. These holders are spaced from the floor of the tray as is indicated at 19 and 20. Said holders are so shaped as to support the food and drink bins 21 and 22 at a distance from the floor of the tray. Thus there is a clear air space between the bins and their holders and the bottom of the tray. This avoids the presence of damp areas which frequently exist concealed between the floor of the tray and the objects of cage furniture which may rest upon it in certain types of cages of previous construction. The sides 13 of the tray are provided with the fixed perch brackets 23, each of which may consist of a flattened wire loop having its ends welded or otherwise fixed to the side of the tray. The flattened or extended parts of said loops lie parallel to the sides of the tray and at such distance from the floor thereof as to keep the perches clear of said floor. Figures 2 and 5 show that the perches are slotted at the ends, as is customary in perches and that they slide along the flattened portions of the perch brackets 23 with friction so that the perches can be adjusted to or from the food and drink bins to suit the convenience or comfort of the bird. It may be observed that there are no end obstructions to the perch brackets 23 so that the perches can upon occasion be slid completely off in removing them for cleansing.

From the above description of the tray, it will be understood that it is unitary with respect to the perch and bin holders, and that the floor of the tray is entirely free from contact with either the bins or perches, making it sanitary and readily cleansed.

The front end of the bird cage is provided with an opening extending thereacross and defined at its top by a rod or stout wire 25 to which the lower ends of the wires 10 are welded or otherwise permanently secured. A hanging door 26 normally occludes this opening, the lower edge of said door when the latter is in closed position resting upon a horizontal ledge 27, which ledge is constituted by a turned back portion of the front end 14 of the tray.

A lug 28 fixed to the tray extends upwardly behind the door when the latter is in closed position. The door is hinged to the rod 25 by the elongated loop hinges 29. These hinges provide lost motion or play for the rod 25. When the door is resting upon the ledge 27 the rod 25 is adjacent the lower end of the loop hinges 29. When the tray is withdrawn sufficiently so that the door is unsupported, it drops through a distance equal to the length of the space within the loop hinges 29 so that the door is then suspended from the rod 25. When in this position the lower edge of the door approaches so close to the floor of the tray or so near to the plate 7 in the event that the tray is entirely withdrawn as to prevent the escape of the bird from beneath said door. This dependent position of the door is illustrated in Figure 6.

The front seed guard 12 slides in the adjacent channeled members 11 in front of the hanging door 26 until it, like the door, rests upon the ledge 27. This seed guard performs the dual function of preventing the door from swinging open, and as the lug 28 projects upward behind the door, the seed guard also locks the tray 9 in its closed position. For removing the tray, the front seed guard 12 is first removed by slipping it upward out of the adjacent channeled members 11. This leaves the door free to swing outward and the tray may be removed by pulling upon the knob 24. As the tray is withdrawn, the door 26 swings up upon the adjacent bin 21 and after said bin has cleared, the door falls down into a vertical plane assuming its lowermost position as shown in Figure 4. When the opposite bin is reached the door again swings up upon said bin sufficiently to permit said bin to pass beneath it and when said bin has cleared the door again falls to its lowermost position. When the tray is re-inserted, the door 26 is held open in an outward direction by the fingers. After the insertion of the tray, the door 26 is manually replaced with its lower edge resting upon the ledge 27.

The bird cage is provided with a swinging ring perch 30 hingedly mounted at 31 upon a clip or hook 32 which embraces one of the cross bars 33 at the top of the cage. For removing this ring perch, it is necessary merely to lift the clip 32 from the cross bar 33 and to slip the ring outward between two adjacent wires.

While I have in the above description disclosed what I believe to be a preferred and practical embodiment of the invention, it will be understood to those skilled in the art that the details of construction and the arrangement of parts as shown and described are by way of example and not to be construed as limiting the scope of the invention as defined in the appended claims.

What I claim is:

1. Bird cage comprising a base and an enclosing structure supported by said base having an opening, a tray slidably removable from said base having a front end forming a closure for the lower part of said opening, a door hinged to overhang said opening forming a closure for that part of the opening not occluded by the front end of said tray, the latter having a projection above the lower edge of said door and inwardly of said door when the tray is in fully inserted position, said door being swingable outwardly pushed by said projection as said tray is withdrawn.

2. Bird cage comprising a base and an enclosing structure supported by said base having an opening, a tray slidably removable from said base having a front end forming a closure for the lower part of said opening, a door hinged to overhang said opening forming a closure for that part of the opening not occluded by the front end of said tray, the latter having a projection above the lower edge of said door and inwardly of said door when the tray is in fully inserted position, said door being swingable outwardly, pushed by said projection, as said tray is withdrawn, and a barrier movable to a position across the outer face of said door to prevent its swinging outwardly, thereby locking said tray against outward displacement.

3. Bird cage comprising a base and an enclosing structure supported by said base having an opening, a tray slidably removable from said base having a front end forming a closure for the lower part of said opening, a door hinged to overhang said opening forming a closure for that part of said opening not occluded by the front end of said tray, the latter having a projection above the lower edge of said door and inwardly of said door when the tray is in fully inserted position, said door being swingable outwardly, pushed by said projection, as said tray is withdrawn, means forming guideways carried by said enclosing structure at opposite sides of said opening, and a removable panel slidable in said guideways to a position across the outer face of said door to prevent its swinging outwardly, thereby locking said tray against outward displacement.

4. Bird cage comprising a base and an enclosing structure supported by said base having an opening, a tray slidably removable from said base having a front end forming a closure for the lower part of said opening, a door hinged to overhang said opening, having lost motion in its hinges whereby it may assume an upper or lower position, said door forming a closure for that part of said opening not occluded by the front end of said tray, said door having a normal upper position in which its lower edge rests upon the front end of said tray, the latter having a projection above the lower edge of said door and inwardly of said door when the tray is in fully inserted position, said door being swingable outwardly, pushed by said projection as said tray is withdrawn, and dropping to its lower position when the front end of said tray has moved out of supporting relation to said door, in which lower position, the lower edge of said door is in sufficient proximity to said base to prevent the escape of the bird.

5. Bird cage as claimed in claim 4, including means forming guideways carried by said enclosing structure at opposite sides of said opening, and a removable panel slidable in said guideways to a position across the outer face of said door to prevent its swinging outwardly, thereby locking said tray against outward displacement.

6. Bird cage comprising a rectangular base and an enclosing structure corresponding in shape to that of said base and secured thereto, one end of said enclosing structure being provided with a rectangular opening, the upper edge of which is defined by a transverse bar forming a part of said enclosing structure, a rectangular tray having upturned sides and ends substantially filling the interior of said base and being slidably removable therefrom, the front end of said tray forming a closure for the lower part of said opening, a door forming a closure for that part of the opening not occluded by the front end of said tray, said door being suspended at its upper edge from said bar by elongated loops providing lost motion whereby said door may occupy an upper or lower position, the front edge of said tray being formed with a ledge upon which the lower edge of said door normally rests maintaining said door in its upper position, said tray having a projection above the lower edge of said door and inwardly of said door when the tray is in fully inserted position, said door being swingable outwardly pushed by said projection, and said tray is withdrawn, and said door when no longer supported by said tray dropping gravitationally to its lower position, in which position its lower edge is in such proximity to said base as to prevent the escape of the bird.

7. Bird cage as claimed in claim 6 including means forming guideways carried by said enclosing structure at opposite sides of said opening, and a removable panel forming part of a surrounding seed guard, slidable in said guideways to a position across the outer face of said door to prevent its swinging outwardly, thereby locking said tray against outward displacement.

8. In a bird cage comprising a base and a wire enclosing structure carried thereby, said base having turned up sides and ends, the front end being open, a tray insertable into said base by way of the open front thereof, said tray having upstanding flanges forming sides and ends, the front end of said tray constituting a closure for the open front of said base, bin holders at opposite ends of said tray spaced from the floor thereof for supporting food and drink bins out of contact with said floor and perch brackets carried by the opposite sides of said tray including guide portions parallel to the floor of said tray and at such height as to support the perches out of contact with the floor of said tray, and slotted ended perches slidable along said guide portions for adjusting said perches to and from said bins.

9. In a bird cage as claimed in claim 8, said perch brackets being characterized by the absence of obstructions at the ends of said guide portions, so that said perches can be slid off of said guide portions to remove them for cleansing.

10. In a bird cage comprising a base and a wire enclosing structure carried thereby, a sliding tray supported by said base insertable into said cage by way of an opening in said base, said tray having an upstanding rim, a portion of which constitutes a closure for said opening, and a bin holder unitary with said tray fixed to said rim and carried thereby spaced from the floor of said tray.

11. In a bird cage comprising a base and a wire enclosing structure carried thereby, a sliding tray supported by said base insertable into said cage by way of an opening in said base, said tray having an upstanding rim, and a bin holder unitary with said tray fixed to said rim and carried thereby spaced from the floor of said tray.

HERBERT G. HOEFLER.